(12) United States Patent
Fischer et al.

(10) Patent No.: US 7,902,974 B2
(45) Date of Patent: Mar. 8, 2011

(54) DEVICE AND METHOD FOR TRIGGERING A VEHICLE OCCUPANT PROTECTION DEVICE OF A MOTOR VEHICLE

(75) Inventors: Thomas Fischer, Beratzhausen (DE); Helge Graβhoff, Regensburg (DE); Bernd Schörwerth, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 256 days.

(21) Appl. No.: 12/088,598

(22) PCT Filed: Sep. 28, 2006

(86) PCT No.: PCT/EP2006/066825
§ 371 (c)(1),
(2), (4) Date: Apr. 15, 2008

(87) PCT Pub. No.: WO2007/036549
PCT Pub. Date: Apr. 5, 2007

(65) Prior Publication Data
US 2008/0218337 A1  Sep. 11, 2008

(30) Foreign Application Priority Data
Sep. 30, 2005  (DE) .......................... 10 2005 046 929

(51) Int. Cl.
*G08B 19/00* (2006.01)

(52) U.S. Cl. ......................................... 340/522; 280/735
(58) Field of Classification Search .................. 340/522, 340/438; 180/271, 274; 280/728.1, 734, 280/735
See application file for complete search history.

(56) References Cited

U.S. PATENT DOCUMENTS

| 6,487,482 | B1  |   | 11/2002 | Mattes et al. |         |
|-----------|-----|---|---------|---------------|---------|
| 6,530,597 | B1  | * | 3/2003  | Nesper et al. | 280/735 |
| 7,213,670 | B2  |   | 5/2007  | Iyoda et al.  |         |
| 2004/0245752 | A1 | * | 12/2004 | Payant et al. | 280/735 |
| 2005/0167960 | A1 | * | 8/2005 | Tanaka et al. | 280/735 |

FOREIGN PATENT DOCUMENTS

| DE | WO0234579 A | * | 2/2002 |
| JP | 2002503585 T |   | 2/2002 |
| JP | 2003034226 A |   | 2/2003 |
| JP | 2004536742 T |   | 12/2004 |
| WO | 03011653 A1 |   | 2/2003 |

* cited by examiner

*Primary Examiner* — John A Tweel, Jr.
(74) *Attorney, Agent, or Firm* — Laurence A. Greenberg; Werner H. Stemer; Ralph E. Locher

(57) ABSTRACT

A device and a method trigger a vehicle occupant protection device of a motor vehicle. The device has a plurality of sensors that are disposed at a first location within the motor vehicle, and an evaluation device that is disposed at a second location within the passenger car. The plurality of signals that are assigned to the plurality of sensors are transmitted from the first location to the evaluation device via a first and a second transmission link of the device.

10 Claims, 3 Drawing Sheets

DEVICE AND METHOD FOR TRIGGERING A VEHICLE OCCUPANT PROTECTION DEVICE OF A MOTOR VEHICLE

BACKGROUND OF THE INVENTION

Field of the Invention

The invention relates to a device and a method for triggering a vehicle occupant protection device of a motor vehicle.

Motor vehicles may be equipped with a vehicle occupant protection device which is activated, for example if the motor vehicle is in an accident, by an evaluation device and is intended thereby at least to reduce the risk of injury to the vehicle occupants in the accident. Examples of such vehicle occupant protection devices include air bags and seat belt retractors. In order to detect an accident, in general an emergency situation of the motor vehicle, the motor vehicle includes a plurality of sensors whereof the signals are evaluated by the evaluation device, as disclosed for example in WO 02/34579 A1, DE 101 23 215 A1 or indeed DE 198 07 124 A1.

For reliable functioning of the sensors, it may be necessary to provide at least a substantial proportion of the sensors at only particular points within the motor vehicle. Conventionally, the sensors and the evaluation device are accommodated in a common housing, which can give rise to problems of space.

DE 101 19 621 A1 (see FIGS. 1 and 5 and the description thereof) discloses a device for triggering a vehicle occupant protection device, having a plurality of sensors at a first location within a motor vehicle, which provide at the first location a plurality of signals including an item of information on an emergency situation of the motor vehicle, and having in each case an associated transmission link, these being provided for transmitting the plurality of signals from the first location to a second location within the motor vehicle. The remote transmission of signals from sensors in this way may, however, easily be disrupted from outside, in particular by electromagnetic or indeed mechanical influences, for example if an associated signal line is damaged mechanically or even completely severed during a vehicle accident.

BRIEF SUMMARY OF THE INVENTION

It is therefore the object of the present invention to provide a secure device and a secure method for triggering a vehicle occupant protection device of a motor vehicle such that this device may be arranged within the motor vehicle with more flexibility.

The object of the invention is achieved by a device for triggering a vehicle occupant protection device of a motor vehicle, including: a plurality of sensors which are arranged at a first location within the motor vehicle and provide at the first location a plurality of signals including an item of information on an emergency situation of the motor vehicle, a first and a second transmission link which are provided for transmitting the plurality of signals from the first location to a second location within the motor vehicle, the two transmission links being arranged such that both transmission links transmit at least a first signal of the plurality of signals from the first location to the second location, and an evaluation device which is arranged at the second location and has a first evaluation means, a second evaluation means and an output means, the evaluation device being constructed such that signals associated with a respective one of the sensors are supplied to the first evaluation means and the first signal is supplied to the second evaluation means, wherein the first evaluation means evaluates the signals supplied thereto for the existence of an emergency situation of the motor vehicle and passes on a corresponding first item of information to the output means, and the second evaluation means evaluates the first signal supplied thereto for the existence of an emergency situation of the motor vehicle and passes on a corresponding second item of information to the output means, and wherein the output means is constructed such that it only emits a second signal, which is provided for activating the vehicle occupant protection device of the motor vehicle, as an output signal of the evaluation device if both the first and the second items of information correspond to an emergency situation.

The device according to the invention for triggering a vehicle occupant protection device of a motor vehicle therefore includes the plurality of sensors arranged at the first location and the evaluation device arranged at the second location. The sensors emit the signals required for the detection of the emergency situation of the motor vehicle, and these are in turn evaluated by the evaluation device. According to the invention, the plurality of sensors and the evaluation device are arranged at two different locations within the motor vehicle. If, for operation of the inventive device, the plurality of sensors has to be arranged at a particular point within the motor vehicle, this is possible in a relatively simple manner with the inventive device, since the plurality of sensors takes up relatively little space. By contrast, the choice of location within the motor vehicle for installing the evaluation device is typically less critical.

However, as a result of the inventive spatial separation of the plurality of sensors and the evaluation device, when the signals are transmitted from the first location to the second, malfunctions which can have the effect of unintentionally triggering the vehicle occupant protection device may occur. For this reason, the inventive device includes the two transmission links over which the signals are transmitted from the sensors to the evaluation device, that is to say from the first location to the second location. Here, at least one of the signals of the plurality of sensors is transmitted over both the first and the second transmission link. This has the effect of creating a precondition that, in the event of disruption of one of the transmission links, the evaluation device does not unintentionally trigger the vehicle occupant protection device. This improves the reliability of the inventive device in respect of unintentional triggering of the vehicle occupant protection device.

The evaluation device of the inventive device includes two evaluation means. All signals are supplied to the first evaluation means, and at least the at least first signal is supplied to the second evaluation means. Both evaluation means evaluate the signals supplied thereto independently of one another and pass on the result of their evaluations to the output means of the evaluation device. The evaluation device includes for example an AND element, with the result that it only activates the vehicle occupant protection device if both evaluations of both evaluation means detect an emergency situation of the motor vehicle. This means that the risk of unintentionally triggering the vehicle occupant protection device if there is a disruption to the signals is reduced.

According to preferred embodiments of the inventive device, the latter is constructed such that only a first portion of the plurality of signals is transmitted to the evaluation device over the first transmission link and/or a second portion, different from the first portion, of the plurality of signals is transmitted to the evaluation device over the second transmission link. This means that the bandwidth of the two transmission links can be reduced.

According to a further variant of the inventive device, the latter includes first and second read devices which are arranged at the first location, the first read device reading the sensors associated with the first portion of the signals and the second read device reading the sensors associated with the second portion of the signals. Preferably, the first transmission link is arranged downstream of the first read device and the second transmission link is arranged downstream of the second read device.

If the at least first signal is to be transmitted to the evaluation device over both transmission links, then according to a variant of the inventive device the two read devices are constructed such that they each read the sensor associated with the first signal.

The first evaluation means bases its evaluation on all signals, and the second evaluation means bases its evaluation at least on the at least one first signal. If only the first signal is supplied to the second evaluation means, as provided for according to a preferred embodiment of the inventive device, then the first signal is used for example as a plausibility check of the evaluation made by the first evaluation means.

According to a preferred variant of the inventive device, the first signal is supplied to the second evaluation device over both the first transmission link and the second transmission link. In this way, it is possible for the second evaluation means to be able, on the basis of a comparison between the first signal transmitted over the first transmission link and the first signal transmitted over the second transmission link, to detect a disruption of one of the two transmission links and hence to be able to block triggering of the vehicle occupant protection device.

The object is also achieved by a method for triggering a vehicle occupant protection device of a motor vehicle, having the following method steps: providing a plurality of signals, coming from a plurality of sensors, at a first location at which the plurality of sensors is arranged within the motor vehicle, wherein the plurality of signals includes an item of information on an emergency situation of the motor vehicle, transmitting the plurality of signals over a first and a second transmission link to an evaluation device which is arranged at a second location within the motor vehicle and includes a first and a second evaluation means, wherein at least a first signal of the plurality of signals is transmitted to the evaluation device over both transmission links, supplying signals which are associated with a respective one of the sensors to the first evaluation means, and supplying the first signal to the second evaluation means, evaluating the signals supplied to the first evaluation means using the first evaluation means and evaluating the first signal using the second evaluation means, and emitting a second signal, which is provided for activating the vehicle occupant protection device of the motor vehicle, as an output signal of the evaluation device if both the evaluation made by the first evaluation means and the evaluation made by the second evaluation means give the result that the motor vehicle is in the emergency situation.

The inventive method may in particular be implemented using the inventive device. Preferred embodiments of the inventive method emerge from the dependent claims.

An exemplary embodiment of the invention is illustrated by way of example in the attached schematic drawings, in which:

DESCRIPTION OF THE INVENTION

Figure 1:
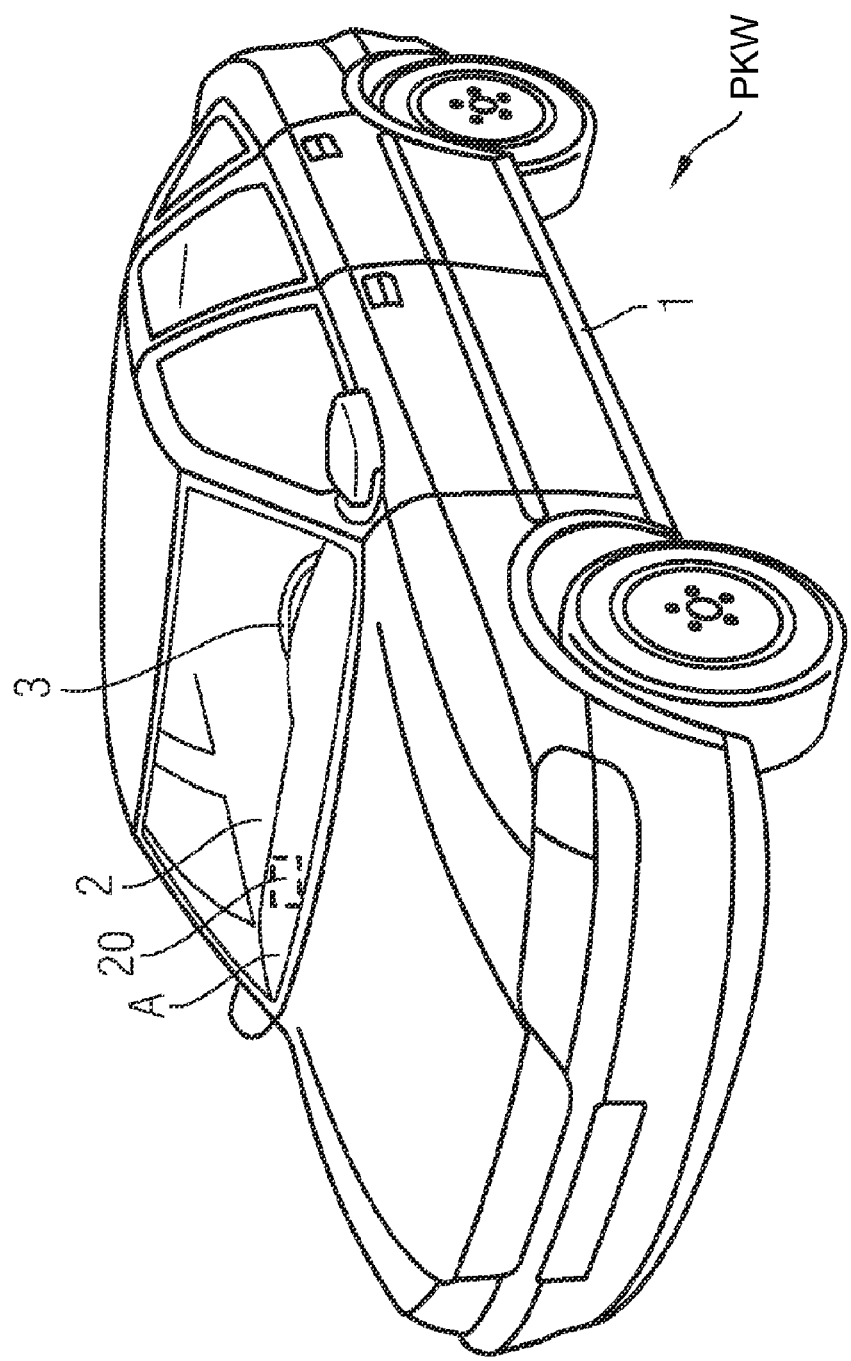
FIG. 1 shows an automobile.

FIG. 1 shows an automobile PKW having a vehicle body 1, a passenger compartment 2 and a steering wheel 3 which is arranged inside the passenger compartment 2. In the case of the present exemplary embodiment, an air bag 4 (illustrated in FIGS. 2 and 3) is integrated within the steering wheel 3 and, if an emergency situation of the automobile PKW occurs, for example if the latter overturns, this air bag is inflated in a generally known manner in order at least to reduce the risk of injury to a driver (not illustrated in the figures).

Figure 2:
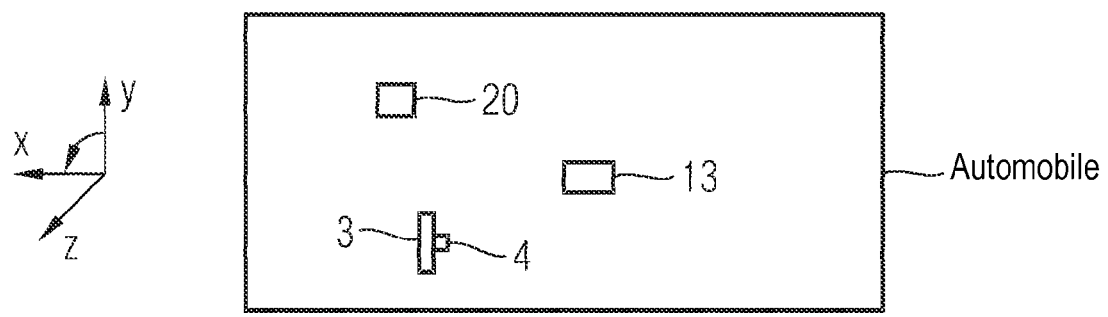
FIG. 2 shows the automobile illustrated in FIG. 1, as a partial block diagram.
Figure 3:
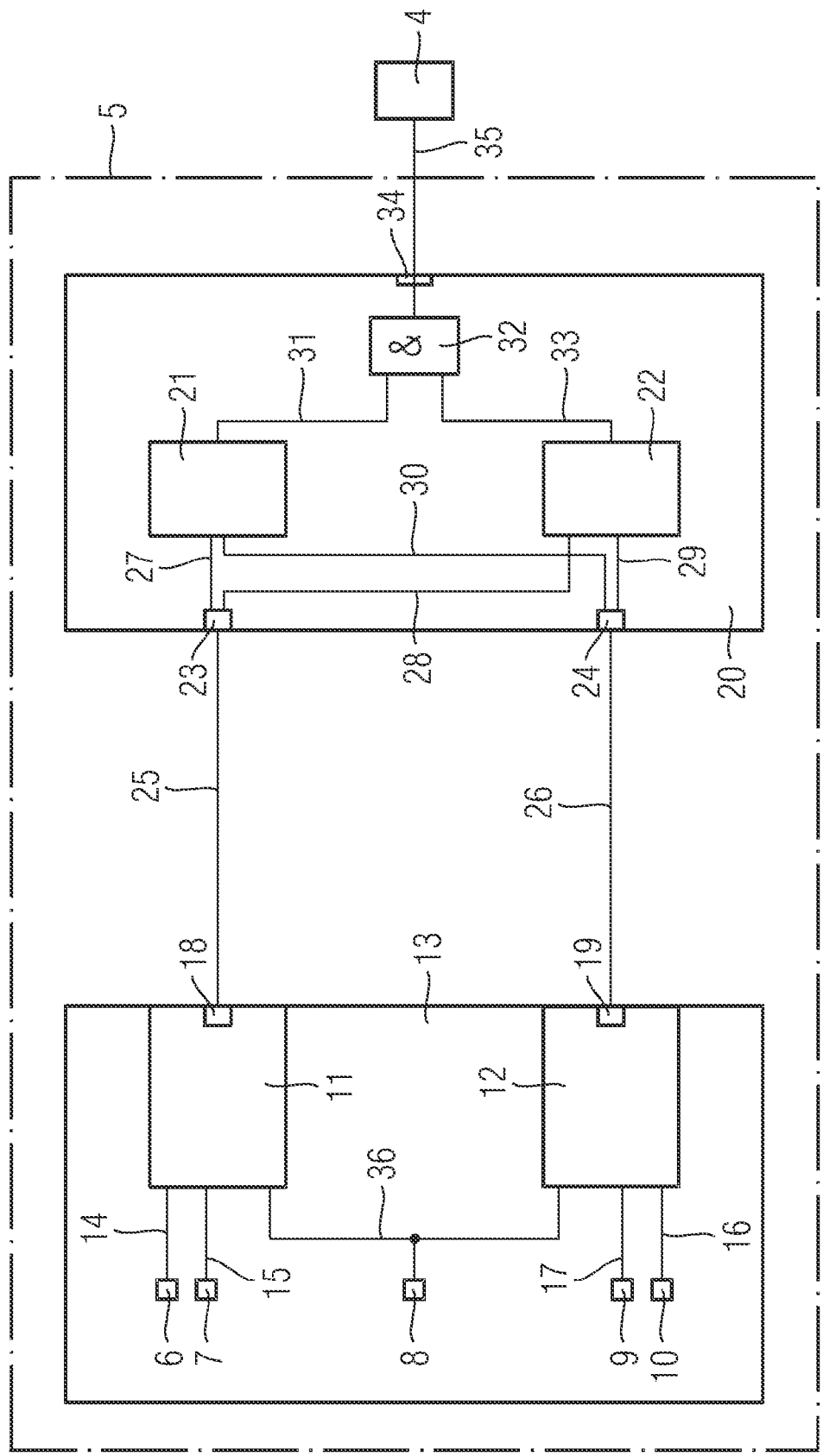
FIG. 3 shows a device for detecting an emergency situation of the automobile illustrated in FIGS. 1 and 2, and an air bag.

In the case of the present exemplary embodiment, the air bag 4 is activated in an emergency situation of the automobile PKW by means of a control circuit 5 illustrated in FIG. 3. In the case of the present exemplary embodiment, the control circuit 5 includes five acceleration sensors 6 to 10 which are read by two read devices 11, 12. The sensors 6-10 and the two triggering devices 11 and 12 are arranged in a common housing 13. The housing 13, in turn, in the case of the present exemplary embodiment is arranged centrally within the passenger compartment 2 of the automobile PKW, as indicated in FIG. 2.

In the case of the present exemplary embodiment, the sensor 6 measures acceleration of the automobile PKW in relation to its longitudinal axis X, and the sensor 7 measures acceleration of the automobile PKW in relation to its transverse axis Y. Similarly, the sensor 9 measures acceleration of the automobile PKW in relation to its transverse axis Y, and the sensor 10 measures acceleration of the automobile PKW in relation to an axis Z which is aligned at a right angle to the plane defined by the longitudinal axis X and the transverse axis Y of the automobile PKW. In the case of the present exemplary embodiment, the two sensors 6 and 7 are more sensitive than the sensors 9 and 10. The sensor 8 measures the angular acceleration of the motor vehicle PKW in relation to the Z axis.

The two sensors 6 and 7 are connected by way of electrical lines 14 and 15 to the first read device 11, and the two sensors 9 and 10 are connected by way of electrical lines 16 and 17 to the second read device 12. The first read device 11 is provided for reading the two sensors 6 and 7 and for providing the resulting electrical signals S1 and S2 at an output 18 of the read device 11. The second read device 12 is provided for reading the two sensors 9 and 10 and for providing corresponding electrical signals S3 and S4 at an output 19 of the second read device 12. The sensor 8 is connected via an electrical line 36 to both read devices 11 and 12, with the result that the two read devices 11 and 12 each read the sensor 8, and the first read device 11 provides a corresponding electrical signal S5 at its output 18 and the second read device 12 provides a corresponding electrical signal S5' at its output 19. The outputs 18, 19 of the two read devices 11, 12 are accessible through the housing 13.

The control circuit 5 furthermore includes an evaluation device 20 which, in the case of the present exemplary embodiment, is arranged below the dashboard A of the automobile PKW. In the case of the present exemplary embodiment, the evaluation device 20 is surrounded by a housing (not illustrated in more detail) and includes a first evaluation means 21, a second evaluation means 22 and two inputs 23 and 24. The input 23 of the evaluation device 20 is connected to the output 18 of the read device 11 by way of a first transmission link 25, and the output 24 of the first evaluation device 20 is connected by way of a second transmission link 26 to the input 19 of the second read device 12. The two transmission links 25 and 26 are electrical lines in the case of the present exemplary embodiment.

Figure 4:
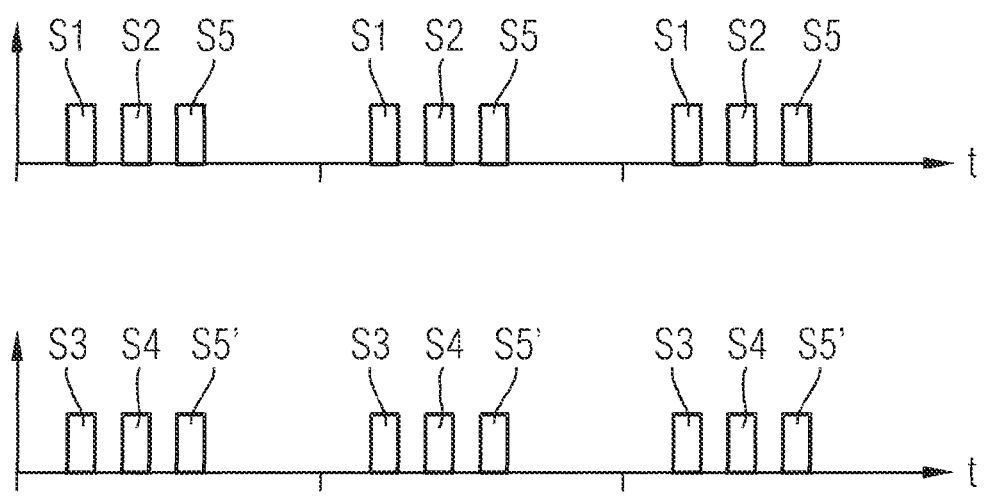
FIG. 4 shows a graph illustrating the time sequence of data transmission within the device shown in FIG. 3.

The signals S1 to S5' of the evaluation device 20, associated with the sensors 6 to 10 and read by the two read devices 11 and 12, are transmitted over the two transmission links 25 and 26. In the case of the present exemplary embodiment, the electrical signals S1 and S2 associated with the sensors 6 and 7 and the electrical signal S5 associated with the sensor 8 are transmitted to the evaluation device 20 over the first transmission link 25 every 166 µs, and the electrical signals S3 and S4 associated with the acceleration sensors 9 and 10 and the electrical signal S5' associated with the sensor 8 are transmitted to the evaluation device 20 over the second transmission link 26 every 166 µs. This is illustrated in FIG. 4.

Furthermore, the input 23 of the evaluation device 20 is connected to the first evaluation means 21 by way of an electrical line 27 and to the second evaluation means 22 by way of an electrical line 28. The input 24 of the evaluation device 20 is connected to the second evaluation means 22 by way of an electrical line 29 and to the first evaluation means 21 by way of an electrical line 30.

In the case of the present exemplary embodiment, the electrical signals S1, S2, S3 and S4 associated with the sensors 6, 7, 9 and 10 and the electrical signal S5 transmitted over the first transmission link 25 and associated with the sensor 8 are supplied to the first evaluation means 21. The first evaluation means 21 is furthermore constructed such that it analyzes these electrical signals S1 to S5 in a manner which is generally known, by comparing the electrical signals S1 to S5 with stored limit values. If the analysis gives the result that the automobile PKW is in an emergency situation, the first evaluation means 21 transmits a corresponding item of information by way of an electrical line 31 to an output device 32 of the evaluation device 20.

In the case of the present exemplary embodiment, the second evaluation means 22 is supplied with both the electrical signal S5 which is associated with the sensor 8 and transmitted over the first transmission link 25 and with the electrical signal S5' which is associated with the sensor 8 and transmitted over the second transmission link 26. It is arranged such that it first compares the two electrical signals S5 and S5' with one another. Only if the two electrical signals S5 and S5' differ by less than a pre-fixed limit value is the electrical signal S5 compared with a further limit value. If the electrical signal S5 exceeds this further limit value, then the second evaluation means transmits an item of information relating to the potential existence of an emergency situation of the automobile PKW to the output device 32 by way of an electrical line 33.

The output device 32 is for its part constructed such that it only passes on an electrical signal to an output 34 of the evaluation device 20 if both evaluation means 21 and 22 indicate that there is an emergency situation of the automobile PKW.

The output 34 of the evaluation device 20 is for its part connected to the air bag 4 by way of an electrical line 35 such that the air bag 5 is activated by way of the electrical line 35 if the output device 32 emits a corresponding signal.

Although the present invention has been described with reference to a preferred exemplary embodiment, the invention is not restricted thereto but may be modified in a variety of ways. In particular, vehicle occupant protection devices other than the air bag 4 described may be used.

The invention claimed is:

1. A device for triggering a vehicle occupant protection device of a motor vehicle, the device comprising:
    a plurality of sensors disposed at a first location within the motor vehicle and provide at the first location a plurality of signals including an item of information on an emergency situation of the motor vehicle;
    a first and a second transmission link for transmitting the plurality of signals from the first location to a second location within the motor vehicle, said first and second transmission links disposed such that both said first and second transmission links transmit at least a first signal of said plurality of signals from the first location to the second location; and
    an evaluation device disposed at the second location and having a first evaluation apparatus, a second evaluation apparatus and an output device, said evaluation device constructed such that signals associated with a respective one of said sensors are supplied to said first evaluation apparatus and the first signal is supplied to the second evaluation apparatus, said first evaluation apparatus evaluates the signals supplied thereto for an existence of the emergency situation of the motor vehicle and passes on a corresponding first item of information to said output device, and the second evaluation apparatus evaluates the first signal supplied thereto for the existence of the emergency situation of the motor vehicle and passes on a corresponding second item of information to said output device, said output device only emits a second signal, for activating the vehicle occupant protection device of the motor vehicle, as an output signal of said evaluation device if both the first and the second items of information correspond to the emergency situation;
    the first location being different from and spaced away from the second location;
    wherein said first transmission link transmits only a first portion of said plurality of signals to said evaluation device; and
    wherein said second transmission link transmits only a second portion of said plurality of signals, different from said first portion of said plurality of signals, to said evaluation device.

2. The device according to claim 1, further comprising first and second read devices disposed at the first location, said first read device reading said sensors associated with said first portion of said plurality of signals and said second read device reading said sensors associated with said second portion of said plurality of signals.

3. The device according to claim 2, wherein said first read device and said second read device read said sensor associated with the first signal.

4. The device according to claim 1, wherein only the first signal is supplied to said second evaluation apparatus.

5. The device according to claim 4, wherein said first signal is transmitted to said evaluation device over both of said first and second transmission links, and said second evaluation apparatus is supplied with both said first signal coming from said first transmission link and coming from said second transmission link.

6. A method for triggering a vehicle occupant protection device of a motor vehicle, which comprises the steps of:
    providing a plurality of signals, coming from a plurality of sensors, at a first location at which the plurality of sensors is disposed within the motor vehicle, the plurality of signals including an item of information on an emergency situation of the motor vehicle;

transmitting the plurality of signals over a first and a second transmission link to an evaluation device disposed at a second location within the motor vehicle and the evaluation device including a first and a second evaluation apparatus, at least a first signal of the plurality of signals being transmitted to the evaluation device over both the first and second transmission links, wherein the first location is different from and spaced away from the second location;

supplying the signals associated with a respective one of the sensors to the first evaluation apparatus, and supplying the first signal to the second evaluation apparatus;

evaluating the signals supplied to the first evaluation apparatus using the first evaluation apparatus and evaluating the first signal using the second evaluation apparatus; and emitting a second signal, for activating the vehicle occupant protection device of the motor vehicle, as an output signal of the evaluation device if both an evaluation made by the first evaluation apparatus and an evaluation made by the second evaluation apparatus give a result that the motor vehicle is in the emergency situation;

transmitting a first portion of the plurality of signals to the evaluation device only over the first transmission link; and transmitting a second portion, different from the first portion, of the plurality of signals to the evaluation device only over the second transmission link.

7. The method according to claim 6, which further comprises using a first read device, disposed at the first location, to read the sensors associated with the first portion of the signals and a second read device, disposed at the first location, to read the sensors associated with the second portion of the signals.

8. The method according to claim 7, which further comprises using both the first read device and the second read device to read the sensor associated with the first signal.

9. The method according to claim 6, which further comprises supplying only the first signal to the second evaluation apparatus.

10. The method according to claim 6, which further comprises transmitting the first signal to the evaluation device over both the first and second transmission links, and the second evaluation apparatus is supplied with both the first signal coming from the first transmission link and coming from the second transmission link.

* * * * *